US012743270B2

(12) United States Patent
Seletskiy et al.

(10) Patent No.: US 12,743,270 B2
(45) Date of Patent: Sep. 22, 2026

(54) SYSTEMS AND METHODS FOR LOADING MODIFIED CLASSES INTO A RUNNING APPLICATION

(71) Applicant: Cloud Linux Software Inc., Estero, FL (US)

(72) Inventors: Igor Seletskiy, Palo Alto, CA (US); Nikita Popov, Perm (RU)

(73) Assignee: Cloud Linux Software, Inc., Estero, FL (US)

( * ) Notice: Subject to any disclaimer, the term of this patent is extended or adjusted under 35 U.S.C. 154(b) by 222 days.

(21) Appl. No.: 18/581,695

(22) Filed: Feb. 20, 2024

(65) Prior Publication Data

US 2025/0265074 A1 Aug. 21, 2025

(51) Int. Cl.
*G06F 8/658* (2018.01)
*G06F 9/455* (2018.01)

(52) U.S. Cl.
CPC .......... *G06F 8/658* (2018.02); *G06F 9/45504* (2013.01)

(58) Field of Classification Search
CPC ............................. G06F 8/658; G06F 9/45504
USPC ........................................................... 717/168
See application file for complete search history.

(56) References Cited

U.S. PATENT DOCUMENTS 8,418,147 B1 * 4/2013 Odenwelder ....... G06F 11/3684 717/131
8,745,598 B2 * 6/2014 Koren ................. G06F 9/44521 717/130
9,141,415 B2 * 9/2015 Rasmussen ............. G06F 8/656
9,798,557 B2 * 10/2017 Gagliardi ................ G06F 8/656
2009/0276483 A1 * 11/2009 Lind ....................... G06F 9/466 709/201

OTHER PUBLICATIONS

SEI CERT Oracle coding standard for Java, Guideline LCK00-J, 2017 Version, published by Carnegie Mellon Univerity Software Engineering Institute in Collaboration with Oracle (Year: 2017).*

Joshua Fox, “When is a Singleton not a Singleton?”, JavaWorld / Oracle Technical Articles (Originally published Jan. 2001, reprinted by Oracle Jun. 6, 2007 (Year: 2001).*

Standard JDK specification for java.lang.instrument,, Oracle's official Java SE 8 documentation published Mar. 2014 (Year: 2014).*

* cited by examiner

*Primary Examiner* — Wei Y Mui
*Assistant Examiner* — Amir Soltanzadeh
(74) *Attorney, Agent, or Firm* — ArentFox Schiff LLP; Michael Fainberg

(57) ABSTRACT

Disclosed herein are systems and method for dynamically updating classes in a running application. In one aspect, a method may include identifying an application running within a virtual machine (VM); generating, within the application, a patcher thread for processing patches; instantiating, within the application, a patcher class using a singleton pattern; installing a shutdown hook in the VM to signal the patcher thread to stop operation and release resources during termination of the application; generating a notification that a live patching facility is set up using a system property in the VM; detecting and executing, via the patcher thread, a task to replace an existing version of a class with an updated version of the class at runtime by scanning, using a polling technique, a tasks directory for new class files and finding the updated version of the class.

20 Claims, 13 Drawing Sheets

100

<u>1100</u>

| Time | Actions | | **Value** of the ***patcherInstance*** static field |
|---|---|---|---|
| | ***Thread #1*** | ***Thread #2*** | |
| | | Initial value: | **null** |
| 1 | Enters the **agentmain** method | Enters the **agentmain** method | |
| 2 | Reads the value of ***patcherInstance*** | Reads the value of ***patcherInstance*** | |
| 3 | Observes **null** as a loaded value | Observes **null** as a loaded value | |
| 4 | Tries to enter the monitor associated with ***patcherInstance*** | Tries to enter the monitor associated with ***patcherInstance*** | |
| 5 | Successfully enters the monitor (= locks its mutex part) | Is blocked by the operating system until the competitor thread (= thread #1) leaves the monitor | |
| 6 | Reads the value of ***patcherInstance*** | Waits | |
| 7 | Observes **null** as a loaded value | Waits | |
| 8 | Invokes the instantiation routine | Waits | |
| 9 | Stores the invocation result (= the patcher instance) into ***patcherInstance*** | Waits | Valid object |
| 10 | Leaves the monitor (= releases its mutex part) | Waits | |
| 11 | Leaves the **agentmain** method | Successfully enters the monitor (= locks its mutex part) | |
| 12 | - | Reads the value of ***patcherInstance*** | |
| 13 | - | Observes a valid object as a loaded value | |
| 14 | - | Skips invocation of the instantiation routine | |
| 15 | - | Leaves the **agentmain** method | |

FIG. 11

SYSTEMS AND METHODS FOR LOADING MODIFIED CLASSES INTO A RUNNING APPLICATION

FIELD OF TECHNOLOGY

The present disclosure relates to the field of software technology, and, more specifically, to systems and methods for loading modified classes into a running application.

BACKGROUND

The reference Java Virtual Machine (JVM) implementation, which is named HotSpot and shipped with the OpenJDK package, has a feature of accepting various maintenance commands through the built-in attach mechanism. This feature is active by default unless overridden by a system administrator with the "–XX:+DisableAttachMechanism" argument to the JVM. If the feature is enabled for a particular JVM instance, a special listener thread whose task is to accept incoming requests through the underlying operating system's facility is spawned within that JVM instance. Commands received by that thread are targeted at the encompassing Java process. Among those commands are: dumping portions of the run-time state of an affected Java process, setting various parameters that correspond with arguments to the JVM, fetching local system properties of a Java application running in the target process, and loading an arbitrary shared library into that process, with its "Agent_OnAttach" function executed as the entry point.

One of the libraries that can be loaded this way is called "instrument." This library is part of the Java Runtime Environment (JRE) provided by the OpenJDK package. The library enables the usage of Java agents that are executable JAR files running in the context of recipient Java applications. The library itself is an example of a native agent, written in a language like C or C++, as opposed to a Java agent. Since a Java agent loaded by the "instrument" library runs in the context of a recipient Java application, the code comprising the agent can access the application's classes, fields, and methods, provided that usual access control checks permit such access. Additionally, the library furnishes the code with a "java.lang.instrument.Instrumentation" object, enabling the code to modify any Java class to a certain degree at runtime, without requiring a restart of the running application.

This feature serves as a foundational element for live patching of Java applications, allowing parts of the code of a Java application to be replaced while it continues to run. Live patching aids in minimizing the downtime of the impacted application, thus mitigating potential financial losses for businesses reliant on it. Should such an application be restarted after conventional patching, a possibly significant startup overhead may come into play, resulting in the aforementioned financial losses.

Given the specific circumstances in which a Java agent runs, it must be designed so as not to interfere with a target Java application, which is not aware of its presence. Moreover, the execution of a Java agent starts with the "agentmain" method, in a manner analogous to the initiation of native agents. This implies that the agent must perform some initialization in its "agentmain" method, ensuring that the entire routine is executed in the least amount of time possible. This requirement exists because all agents, whether Java or native, have their initialization routines executed in the listener thread. Therefore, while an agent is being set up, the whole attach mechanism is stalled for a recipient JVM instance. Thus, there is a need to specify the actions that the "agentmain" method should take to both achieve the stated objective of live patching the target Java application and meet the imposed requirement.

SUMMARY

In one exemplary aspect, the techniques described herein relate to a method for dynamically updating classes in a running application, a method including: identifying an application running within a virtual machine (VM); generating, within the application, a patcher thread for processing patches, wherein the patcher thread is set as a daemon thread and is distinct from a listener thread; instantiating, within the application, a patcher class using a singleton pattern to prevent the patcher class from being instantiated multiple times; installing a shutdown hook in the VM to signal the patcher thread to stop operation and release resources during termination of the application; generating a notification that a live patching facility is set up using a system property in the VM; detecting, via the patcher thread, a task to replace an existing version of a class with an updated version of the class at runtime by scanning, using a polling technique, a tasks directory for new class files and finding the updated version of the class; and executing, by the patcher thread, the task to replace the existing version of the class with the updated version.

In some aspects, the techniques described herein relate to a method, wherein the VM is a Java Virtual Machine (JVM).

In some aspects, the techniques described herein relate to a method, further including managing synchronization to control access to the patcher class using a complementary field and a guarded field, wherein the complementary field includes an object used for a monitor that is set to guard access to the guarded field, and wherein the guarded field includes null as a default value.

In some aspects, the techniques described herein relate to a method, wherein the object includes a java.lang.Object class, and wherein instantiation of the patcher class is managed through the complementary field for synchronization purposes, further including: using a reflection object of the patcher class for synchronization instead of the complementary field.

In some aspects, the techniques described herein relate to a method, wherein generating, within the application, the patcher thread includes: instantiating the patcher thread during execution of an agentmain routine of a live patching Java agent; and setting a daemon property of the patcher thread before a start routine is invoked to allow for the termination of the application.

In some aspects, the techniques described herein relate to a method, wherein subsequent to generating the notification, the agentmain routine receives an options string and an instance of a java.lang.instrument.Instrumentation class as arguments, wherein the options string includes a file system path to the task directory including updated class files.

In some aspects, the techniques described herein relate to a method, further including: scanning the task directory periodically for new class files representing updated classes; and determining an eligibility of class files for update based on modification timestamps and a registry of applied class files.

In some aspects, the techniques described herein relate to a method, further including executing a redefineClasses routine on an instrumentation object to apply updates to loaded classes and only allowing changes to routine bodies while keeping externally visible signatures constant.

In some aspects, the techniques described herein relate to a method, further including registering the shutdown hook in a run routine of the patcher thread to ensure execution upon the termination of the application.

In some aspects, the techniques described herein relate to a method, wherein generating the notification includes setting a designated system property in a system properties table of the VM.

It should be noted that the methods described above may be implemented in a system comprising a hardware processor. Alternatively, the methods may be implemented using computer executable instructions of a non-transitory computer readable medium.

In some aspects, the techniques described herein relate to a system for dynamically updating classes in a running application, including: at least one memory; and at least one hardware processor coupled with the at least one memory and configured, individually or in combination, to: identify an application running within a virtual machine (VM); generate, within the application, a patcher thread for processing patches, wherein the patcher thread is set as a daemon thread and is distinct from a listener thread; instantiate, within the application, a patcher class using a singleton pattern to prevent the patcher class from being instantiated multiple times; install a shutdown hook in the VM to signal the patcher thread to stop operation and release resources during termination of the application; generate a notification that a live patching facility is set up using a system property in the VM; detect, via the patcher thread, a task to replace an existing version of a class with an updated version of the class at runtime by scanning, using a polling technique, a tasks directory for new class files and finding the updated version of the class; and execute, by the patcher thread, the task to replace the existing version of the class with the updated version.

In some aspects, the techniques described herein relate to a non-transitory computer readable medium storing thereon computer executable instructions for dynamically updating classes in a running application, including instructions for: identifying an application running within a virtual machine (VM); generating, within the application, a patcher thread for processing patches, wherein the patcher thread is set as a daemon thread and is distinct from a listener thread; instantiating, within the application, a patcher class using a singleton pattern to prevent the patcher class from being instantiated multiple times; installing a shutdown hook in the VM to signal the patcher thread to stop operation and release resources during termination of the application; generating a notification that a live patching facility is set up using a system property in the VM; detecting, via the patcher thread, a task to replace an existing version of a class with an updated version of the class at runtime by scanning, using a polling technique, a tasks directory for new class files and finding the updated version of the class; and executing, by the patcher thread, the task to replace the existing version of the class with the updated version.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 11 is a flow diagram illustrating an example of two thread accessing the value of patcherInstance.

DETAILED DESCRIPTION

Figure 1:
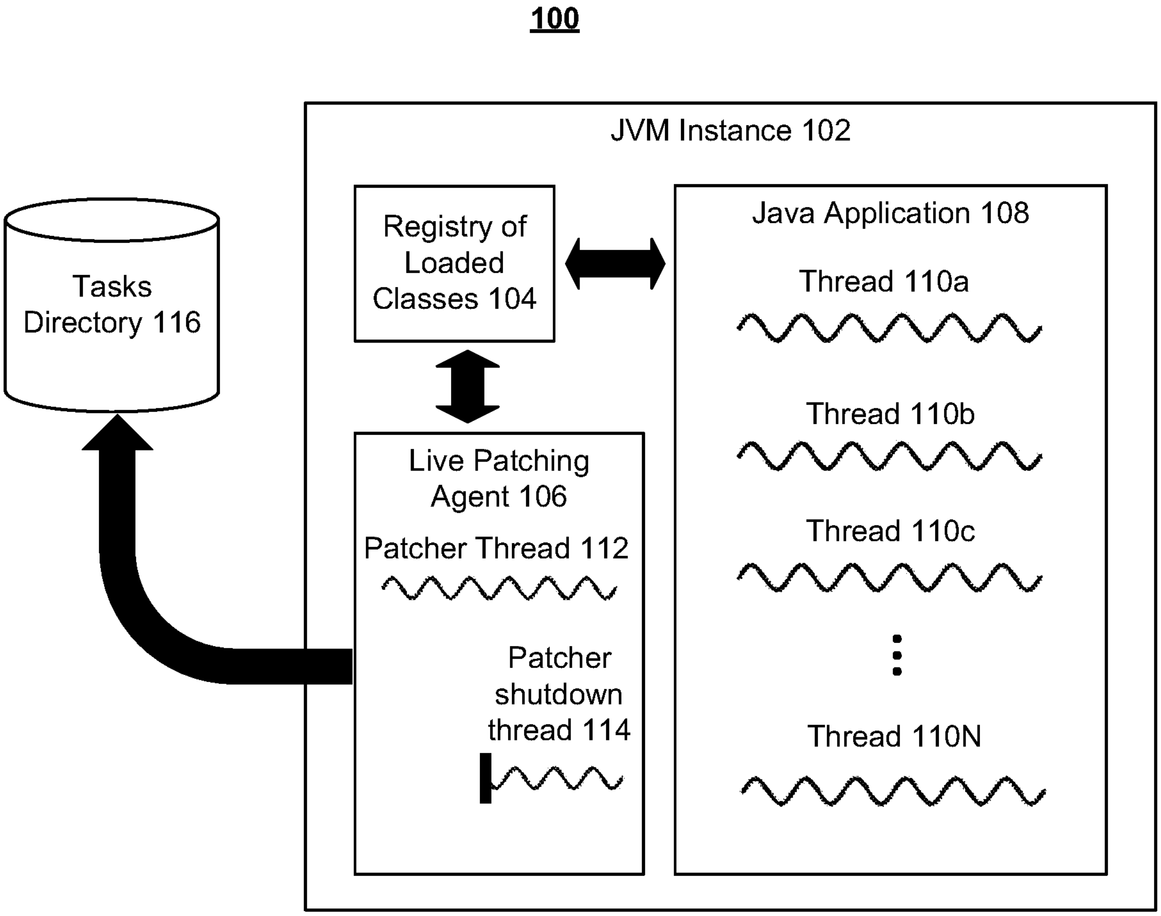
FIG. 1 is a block diagram illustrating a system for loading modified classes into a running application.

Exemplary aspects are described herein in the context of a system, method, and computer program product for loading modified classes into a running application. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The current disclosure describes systems and methods for loading modified classes into a running application. Although the systems and methods are applicable to any programming language, for simplicity, the examples in the present disclosure are provided for Java classes.

To achieve the goal of loading modified classes into a running application, the following issues are addressed. First, restrictions imposed on the code comprising the "agentmain" method are considered. Among those restrictions is the method's execution that is limited in time, which implies that no steady processing of patches can take place in the listener thread. A possible solution to this issue is to spawn another thread (e.g., a patcher thread). Second, a system featuring the live patching Java agent needs to avoid repeat initialization. In particular, spawning a patcher thread must occur only once over the agent's lifespan. The spawning of a patcher thread happens as a part of an overall initialization process, which should occur only once. Basically, this clause suggests that a secure do-once paradigm should be used in view of a multi-threaded environment because JVM internals provide no protection against repeat invocations of the "agentmain" method. Also, this provides extra security to a target application by avoiding excessive resource consumption. The lesser the interference with a target application, the better (no interference is impossible).

One of the possible solutions to this problem is using the singleton pattern wherein a patcher class (e.g., a class implementing the static "agentmain" method) is instantiated a single time. With this approach, the instantiation routine is protected from simultaneous invocations with appropriate synchronization. The presence of the sole instance is a sign that the entire "agentmain" method must not proceed with initialization. Typically, it means that this method returns immediately without any work done. In addition to instantiating the patcher class, the same instantiation routine is responsible for creating the patcher thread, leveraging the very same synchronization scheme. And finally, any interference with the host Java application must be circumvented. To ensure this, the patcher thread's creation parameters are tweaked in a specific manner. The solutions to these issues are further explained in the following paragraphs.

Proper synchronization can be achieved with a static field carrying an object (e.g., an instance of the "java.lang.Object" class (hereafter, the complementary field)). The complementary field is defined in the patcher class and the designated object is assigned to this field in a static context before the "agentmain" method runs. The object is used for its monitor, which is set to guard access to another static field (hereafter, the guarded field). The guarded field is meant to hold the sole instance of the patcher class with null as a default value. The reason behind defining the complementary field is that only valid Java objects (e.g., those objects pointed by non-null references) allow for monitor operations executed on them, whereas the guarded field is initialized to null. This makes the guarded field's monitor unsuitable for synchronization. In the exemplary aspect, the synchronization is based on the "check-lock-repeat check" pattern wherein the guarded field is tested for a valid value first, without entering the monitor associated with the complementary field. If the guarded field is empty (e.g., it includes null), the "synchronized" statement is executed on the complementary field thereby safely entering its monitor. Under the held monitor, the initial check is then repeated. If the guarded field is still empty, the instantiation routine is finally invoked and its return value is assigned to this field.

In some aspects, instead of using a static field to protect the instantiation routine, the patcher class's reflection object can be used in place of that field. While loading a Java class, JVM creates a special "java.lang.Class" object for that class to be used for reflection. That object can be accessed with a special syntax in the "agentmain" method. As a Java object, that object also has an associated monitor that fits the aforementioned technique. The rest of this technique is the same.

As mentioned before, the steady processing of patches must occur in a separate thread that is distinct from the listener thread. The instantiation routine is responsible for spawning such a thread along with creation of the single instance of the patcher class. In order to not impede application's ability to terminate, the spawned thread must be a daemon one. Internally, JVM prevents application shutdown whether it is caused by either invocation of the "exit" method of the "java.lang.System" class or returning from the application's main method if there is at least one non-daemon thread running besides the main thread. Usually, the main thread is aware of non-daemon threads that it spawns and, consequently, is able to wait until those threads complete by means of the "join" method of the "java.lang.Thread" class. However, the live patching Java agent which holds the "agentmain" method in the patcher class is an external entity to an impacted Java application by definition. The application has no way to be aware of any threads that are spawned on behalf of the agent. Therefore, a "java.lang.Thread" instance corresponding to the patcher thread must have its "daemon" property set before the "start" method is invoked on it. Without this precaution, it is likely that this property will have an incorrect value as this value is inherited from the parent thread. With a daemon thread, the impacted application is allowed to gracefully terminate at the cost of the Java agent losing the ability to clean up on shutdown. This happens because a termination event causes all the daemon threads of an application to terminate abruptly.

To overcome this shortcoming, a shutdown hook can be installed in the Java run-time environment of the impacted application. Shutdown hooks are thread objects (e.g., instances of the "java.lang.Thread" class) for which associated threads have not been started yet. The Java run-time environment starts all the registered shutdown hooks on a termination event and waits for all of them to complete by joining on corresponding threads in a sequence. Moreover, the running JVM instance does not terminate until that part of the Java run-time finishes. This allows for intercepting shutdown events to signal the patcher thread via a designated volatile field to stop its operation and release held resources. To guarantee that the shutdown hook is started after the patcher thread itself, the hook must be registered in the "run" method for the patcher thread with the "addShutdownHook" method of the "java.lang.Runtime" class. This method acts on the single instance that can be retrieved with the static "getRuntime" method of the same class. In the exemplary aspect, the patcher class implements the "java.lang.Runnable" interface and, therefore, defines the very "run" method specifying the patcher thread's entry point. Additionally, the shutdown hook is provided by a separate patcher shutdown class which also implements the mentioned interface. This class is instantiated in the patcher class's "run" method. Then, from that instance a thread object that is a shutdown hook is allocated using the standard Java operator. Finally, that thread object is registered with the Java run-time environment. During construction, the instance of the patcher shutdown class receives a reference to the patcher class's sole instance as well as a reference to the thread object for the patcher thread. The former is accessible through the special "this" argument to the patcher class's "run" method while the latter can be retrieved with the static "currentThread" method of the "java.lang.Thread" class. During execution of the patcher shutdown class's "run" method in the context of a shutdown hook's thread (hereafter, the patcher shutdown thread), the patcher thread can be notified by means of setting that volatile field and utilizing the "interrupt" method on the thread object for the patcher thread. The order of actions must be this specific one. All that remains for the patcher shutdown thread is to use "isAlive", and "join" methods on the thread object for the patcher thread until that thread quits.

Once the patcher thread is started, the instantiation routine needs to signal that the live patching facility is fully set up as the last step. This signaling serves as a notification mechanism for an external entity (e.g., a system or process) that has loaded the live patching Java agent into the current JVM instance. One of the possible ways in which such notification can be carried out is using system properties of the JVM instance. System properties are saved in a special hash table as pairs of string keys and string values. This table is local for a JVM instance running a particular Java application. Such a Java application has complete control over the contents of its table. Even though a Java process generally cannot observe the system properties of another Java process, the former process can actually fetch the latter process's system properties using the "getSystemProperties" method of the "com.sun.tools.attach.VirtualMachine" class, provided that enough privileges are held. The former process invokes this method on a virtual machine handle for the latter process. All of this suggests that setting a designated system property by the Java agent indicates to the external entity that this agent is initialized. The external entity may opt to skip repeat loading of the executable JAR file comprising this very agent into the current JVM instance if that entity sees this system property among those fetched from the JVM instance. In the exemplary aspect, the naming of the designated system property's key follows the usual dot-notation. The leading components of the key's name match the package name of the patcher class to reduce the risk of collisions with existing keys. At the same time, the value of the system property encodes the current JVM instance's process identifier (e.g., PID on UNIX). This scheme is basically a signature protocol to help a system or process controlling the live patching Java agent verify the presence of this agent in a target Java process.

According to the specification, the "agentmain" method, with which the execution of a Java agent starts in a recipient Java process, receives two arguments. The first argument is an options string having arbitrary contents. The second argument is an instance of the "java.lang.instrument.Instrumentation" class. That instance can be used to replace Java classes with newer versions at run-time. Of these two arguments, the options string is free for use as the business logic of a Java agent demands. In consideration of live patching features, the options string must include a location specifier where newer versions of classes can be found. In the exemplary aspect, the location specifier is a file system path to a directory keeping class files (hereafter, the tasks directory). Those class files constitute newer versions of classes. The presence of a class file in the tasks directory means that the corresponding Java class is to be upgraded with the class file's contents. To facilitate replacement of the specified class using its class file, the name of the class file is set to match the fully qualified name of that class in the dot-notation. Beside the tasks directory path, the string-encoded process identifier of the current JVM instance is put into the options string. The process identifier, which is a mere integer on UNIX, comes first. It is followed by a delimiter character distinct from all the characters that may occur in a valid representation of an integer. The ampersand ('&') character, that is selected for a reference implementation for this purpose, is an example of such a delimiter. Finally, the options string comes last. Adhering to this format simplifies the extraction of individual values for the live patching Java agent. Although providing the process identifier to the Java agent in the options string is not strictly necessary, doing so simplifies the coding considerably. For such a Java agent, it is relatively hard to query the process identifier of a recipient JVM instance, whereas the controlling system can easily determine this process identifier using a virtual machine handle for that particular JVM instance.

Completing all the previous steps enables the live patching Java agent to enter the main operational phase wherein the patcher thread waits for incoming tasks to replace particular Java classes with newer versions at run-time and then completes these tasks. In order to facilitate the graceful termination of the agent, the polling technique should be used. In this technique, the tasks directory is scanned periodically with intervening invocations of the static "sleep" method of the "java.lang.Thread" class to reduce CPU usage. One of the useful features of such calls is that a sleeping thread can actually be woken beforehand with the "interrupt" method of the same "java.lang.Thread" class invoked on the associated thread object. As discussed earlier, the patcher shutdown thread is able to stop the patcher thread by taking certain actions in a specific order. Of these actions, invoking the "interrupt" method on the patcher thread's object resumes that thread. The patcher thread will observe a "java.lang.InterruptedException" exception thrown. That exception can be safely ignored, provided that the patcher shutdown thread also sets a designated volatile field that acts like a stop flag. If the patcher shutdown thread sets that volatile field first and only then uses the "interrupt" method, the patcher thread will break the main operational loop immediately, given that it tracks the state of this field.

If a class file representing an updated version of a class is put into the tasks directory, the patcher thread will discover it while scanning the directory. As mentioned earlier, the name of this class file is expected to be the fully qualified name of the corresponding class in the dot-notation. The existence of a class file constitutes a task. The patcher thread fulfills the task in two steps. At the first step, it is determined if the class file is eligible for application on the current JVM instance. The eligibility criterion is that an already applied class file is skipped, unless it is newer than the one previously applied. So, the patcher thread proceeds with the task if the class file has never been applied or its modification timestamp is greater than the last recorded one for the very same class. To facilitate this decision making, the registry of the class files applied is maintained. Various data structures can underlie this registry. In the exemplary aspect, the hash table mapping fully qualified class names onto modification timestamps of respective class files is used. When the decision about whether to apply a particular class file on the current JVM instance is being made, the fully qualified name of the corresponding class, that is taken from the class file's name, is used to look up the registered modification timestamp. This modification timestamp, if present, denotes the latest applied version of this very class file. If there is no modification timestamp registered for the considered file or the file's modification timestamp is numerically greater than the registered one, the patcher thread moves on to the second step of the task completion procedure. Later on, when the task is fully completed, the class file's modification timestamp is saved into the registry for future reference. Otherwise, the task is skipped (i.e., the corresponding Java class is not upgraded with the class file's contents). Overall, this eligibility check helps to ensure that a single class file is not used twice.

At the second step, the patcher thread uses the class file's name and contents to compose parameters for a special method enabling limited run-time modification of loaded Java classes, then this method is invoked with the prepared parameters. The method's name is "redefineClasses." The method is used on an object of an implementation-defined concrete subclass of the "java.lang.instrument.Instrumentation" class. This object is passed to the Java agent's "agentmain" method by the JVM and stored for further use. The method allows for limited adjustments of a loaded Java class. Fundamentally, only method bodies are allowed to change. Moreover, the externally visible side of that class (e.g., signatures of non-private methods, must remain constant). In order to utilize the "redefineClasses" method, a "ClassDefinition" object must be constructed as this method accepts a sequence of such objects to replace the definitions of respective Java classes. A "ClassDefinition" object wraps a target class's reflection object (e.g., a "java.lang.Class" class's instance that is created automatically by the JVM), and the contents of a corresponding class file, which have been turned into an array of bytes. With the selected representation of a live patching task, it is straightforward to construct a "ClassDefinition" object for the target class. The fully qualified name of the target class, which matches the class file's name, is mapped onto the corresponding reflection object with the "forName" method of the "java.lang.Class" class. The array of bytes for the new class definition is built by reading this very class file into a local buffer. In the exemplary aspect, the class file is memory-mapped to facilitate such reading. After carrying out these preparatory actions, the "redefineClasses" method is finally invoked on the stored instrumentation instance to actually perform the live patching of the target class.

FIG. 1 is a block diagram illustrating a system 100 for loading modified classes into a running application. FIG. 1 overviews a Java process with live patching agent 106 as well as the interconnection among the key actors. A Java application 108 carrying some business logic is made of multiple threads of control (e.g., threads 110*a*, 110*b*, 110*c*, . . . 110N). The JVM (e.g., the implementation from the OpenJDK package) instance 102 powers this application 108 by processing its constituent bytecode instructions and data definitions and providing access to the services of the underlying operating system via native methods.

To facilitate execution of Java application 108, the JVM instance 102 maintains registries of metadata (e.g., including registry of loaded classes 104). Such metadata includes run-time images of classes (e.g., loaded classes), methods, and constant pools among others. These run-time images correspond with the similar objects found in a typical class file. There is the main registry called the system registry that maps fully qualified class names onto corresponding run-time images of loaded classes. It is the system registry that is touched by live patching agent 106 that replaces a Java class with its newer version.

In the present disclosure, all the subtleties of manipulating the system registry are of no concern since the JVM instance 102 provides a higher level API for class replacement. In particular, this API, called class redefinition, manages synchronization of concurrent accesses to the system registry as well as delayed recycling of run-time images of older class versions if those versions are still used by the application code. Overall, live patching agent 106 is built on top of the class redefinition API.

As FIG. 1 demonstrates, live patching agent 106 runs in two threads of control. The patcher thread 112 is the main one in which the thread's initialization sequence is followed by the periodic polling of tasks directory 116. During the initialization, another thread (e.g., patcher shutdown thread 114), serving to facilitate graceful termination of the main thread, is prepared, but not started. The other thread is registered with the Java run-time environment as a shutdown hook to be run at the application's termination time. Once the initialization is done, the patcher thread enters the main loop where the periodic polling of the tasks directory 116 takes place. If a class file is discovered within this directory at some iteration, this class file is used to replace a target class using the class redefinition API, provided that such action has not been taken earlier.

Figure 2:
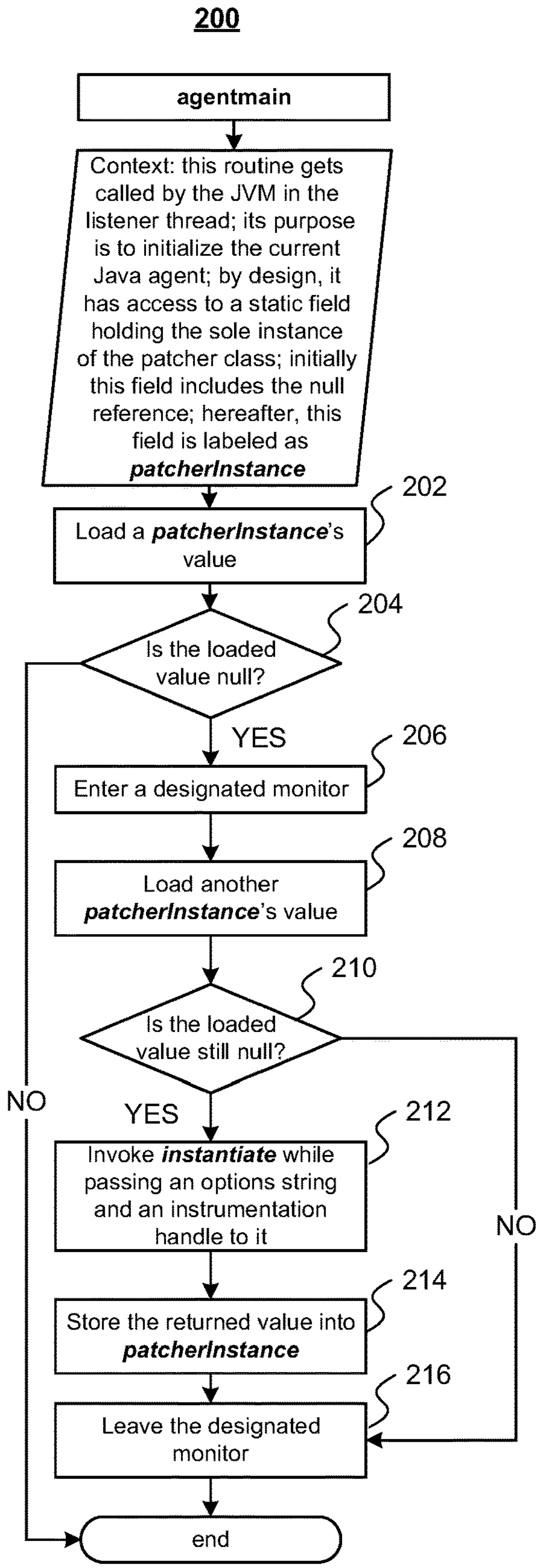
FIG. 2 is a flow diagram that illustrates a synchronization scheme over an instantiation routine.

FIG. 2 is a flow diagram 200 that illustrates a synchronization scheme over an instantiation routine. FIG. 2 depicts the reference design of the "agentmain" method. According to this design, the "agentmain" method handles invocations of the instantiation routine in a secure way, utilizing the "check-lock-repeat check" pattern that is widespread in Java programming. As a result, the instantiation routine is called no more than a single time. "agentmain" gets called by JVM instance 102 in the listener thread and initializes the current Java agent. "agentmain" has access to a static field (initially includes the null reference) holding the sole instance of the patcher class. This static field is referred to as patcherInstance.

The sample implementation of the "agentmain" method is as follows:

```
static public void agentmain(String options,
  Instrumentation handle)
  throws IllegalArgumentException {
  if (patcherInstance==null) {
    synchronized (Patcher.class) {
      if (patcherInstance==null) {
        patcherInstance=instantiate(options,
          handle);
      }
    }
  }
}
```

In flow diagram 200, "agentmain" loads a patcherInstance's value at 202. At 204, "agentmain" determines whether the loaded value is null. If not, diagram 200 ends. If yes, diagram 200 proceeds to 206, where "agentmain" enters a designated monitor. In general, some static object is used to guard access to the instantiation routine following the 'check-lock-check' pattern. By entering the monitor associated with this object (i.e., a designated monitor), a thread performs the 'lock' operation on the mutex part of this monitor. At 208, "agentmain" loads another patcherInstance's value. At 210, agent 106 determines whether the loaded value is still null. If yes, "agentmain" invokes "instantiate" while passing an options string and an instrumentation handle to "instantiate" at 212. At 214, "agentmain" stores the returned value into patcherInstance. If at 210, "agentmain" determines that the loaded value is not null, diagram 200 proceeds to 216. After 214, diagram 200 also proceeds to 216. At 216, "agentmain" leaves the designated monitor. After 216, diagram 200 ends.

Figure 3:
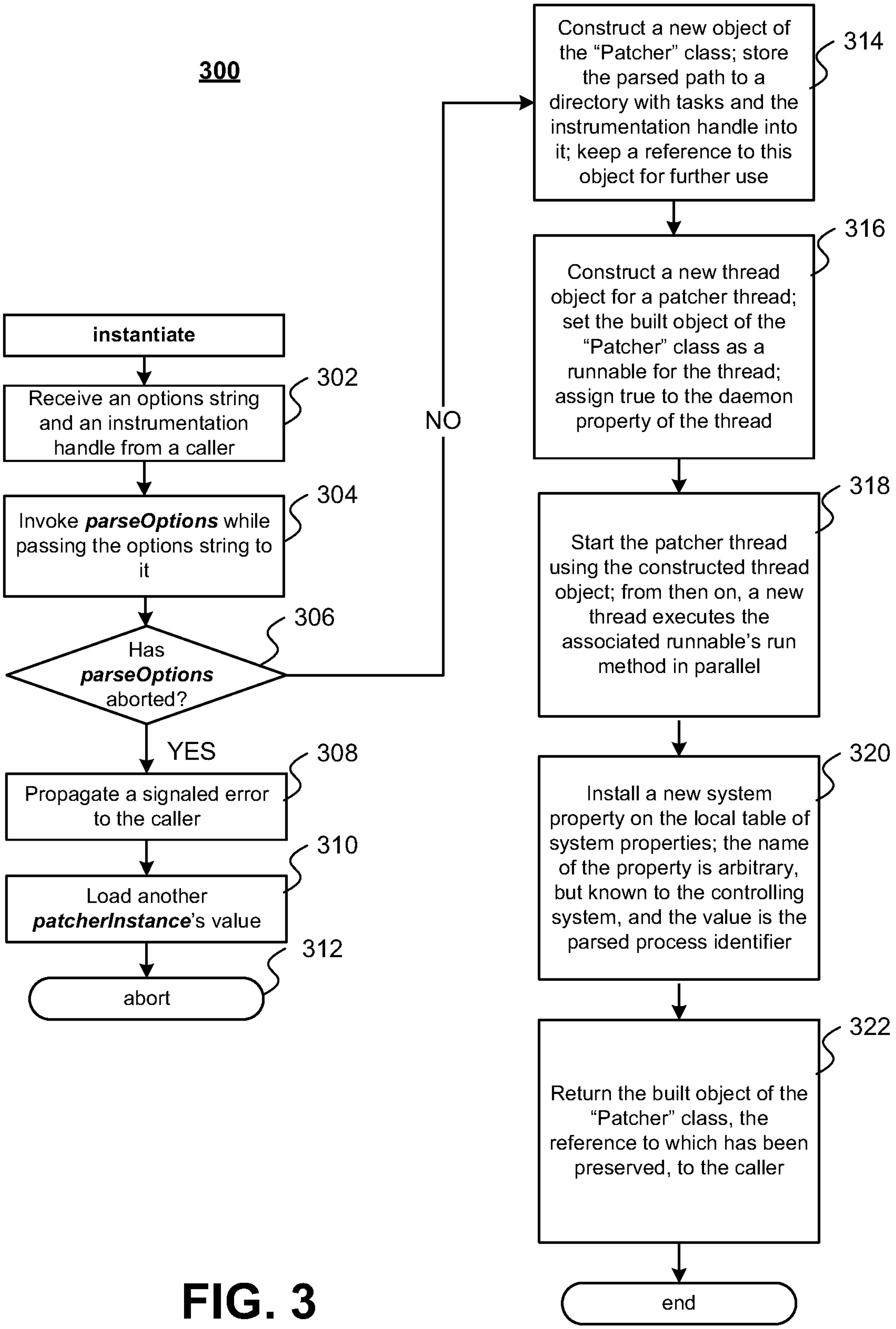
FIG. 3 is a flow diagram that illustrates the instantiation routine.

FIG. 3 is a flow diagram 300 that illustrates the "instantiate" routine. In some aspects, diagram 300 is invoked at block 212 of diagram 200. In flow diagram 300, "instantiate" receives an options string and an instrumentation handle from a caller (e.g., "agentmain") at 302. At 304, "instantiate" invokes "parseOptions" while passing the options string to it. At 306, "instantiate" determines whether "parseOptions" has aborted. If yes, diagram 300 advances to 308. At 308, "instantiate" propagates a signaled error to the caller. At 310, "instantiate" loads another patcherInstance's value. At 312, "instantiate" aborts.

If at 306, "instantiate" determines that "parseOptions" has not aborted, diagram 300 advances to 314, "instantiate" constructs a new object of the "Patcher" class, stores the parsed path to a directory with tasks (e.g., tasks directory 116) and the instrumentation handle into it, and keeps a reference to this object for further use. At 316, "instantiate" constructs a new thread object for a patcher thread 112, sets the built object of the "Patcher" class as a runnable for the thread 112, and assigns true to the daemon property of the thread 112. At 318, "instantiate" starts the patcher thread 112 using the constructed thread object and from then on, a new thread executes the associated runnable's run method in parallel. At 320, "instantiate" installs a new system property on the local table of system properties. It should be noted that the name of the property is arbitrary, but known to the controlling system, and the value is the parsed process identifier. At 322, "instantiate" returns the built object of the "Patcher" class (the reference to which has been preserved, to the caller).

Figure 4:
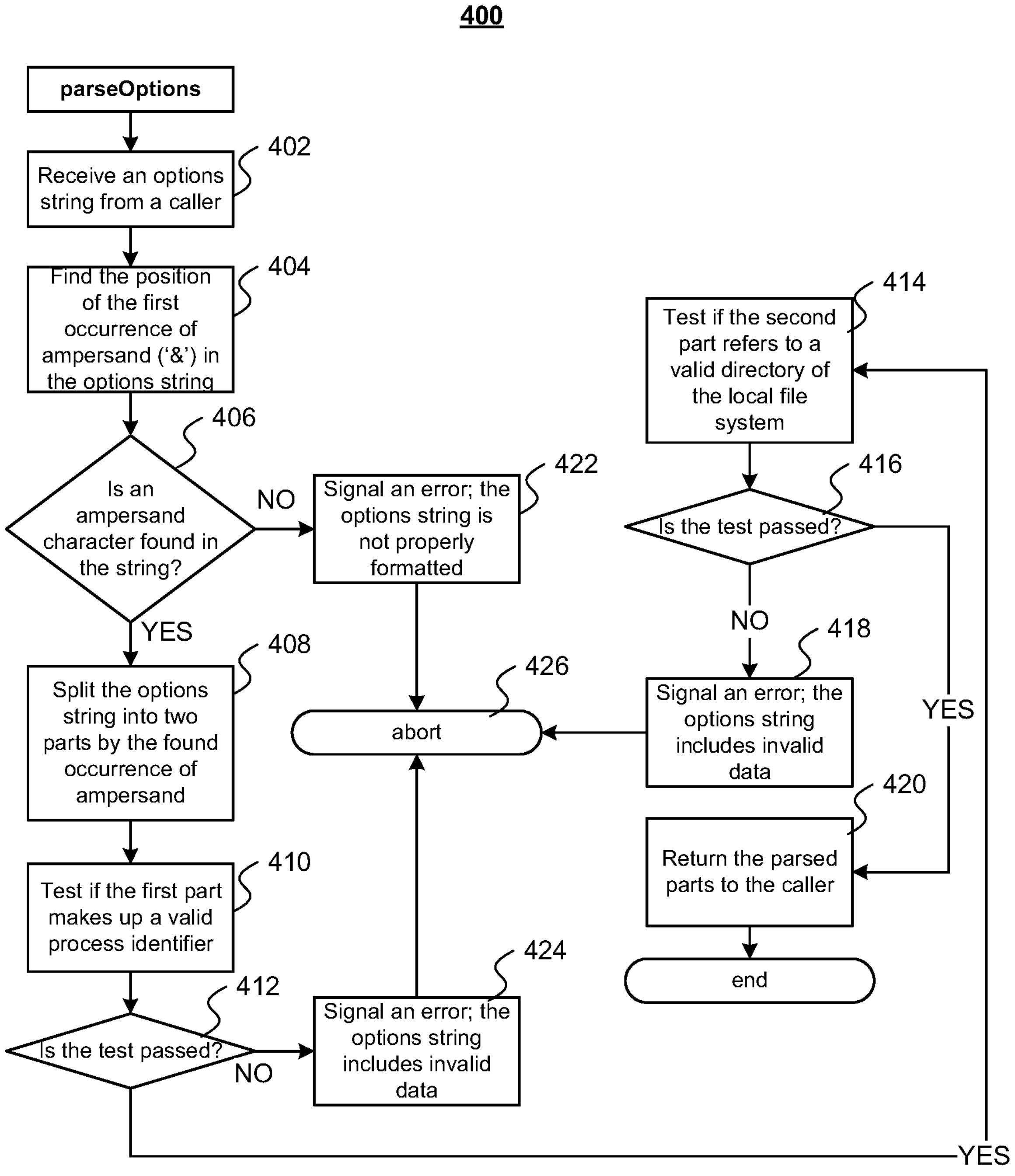
FIG. 4 is a flow diagram that illustrates routine parsing of an options string.

FIG. 4 is a flow diagram 400 that illustrates routine parsing of an options string. In some aspects, diagram 400 is invoked at block 304 of diagram 300 (where "parseOptions" is invoked). In flow diagram 400, at 402, "parseOptions" receives an options string from a caller (e.g., "instantiate"). At 404, "parseOptions" finds the position of a first occurrence of a delimiting character in the options string. More specifically, suppose that the delimiting character is an ampersand ('&'). At 406, "parseOptions" determines whether an ampersand character is found in the string. If not, diagram 400 advances to 422, where "parseOptions" signals an error indicating that the options string is not properly formatted. Subsequently, diagram 400 advances to 426, where "parseOptions" is aborted.

If at 406, "parseOptions" determines that an ampersand character is found in the string, diagram 400 advances to 408, where "parseOptions" splits the options string into two parts by the found occurrence of ampersand. At 410, "parseOptions" tests if the first part makes up a valid process identifier. At 412, "parseOptions" determines whether the test was passed. If not, diagram 400 advances to 424, where "parseOptions" signals an error indicating that the options string includes invalid data and subsequently aborts "parseOptions" at 426.

If the test is passed, from 412 diagram 400 advances to 414, where "parseOptions" tests if the second part refers to a valid directory of the local file system. At 416, "parseOptions" determines whether this second test is passed. If not, at 418, "parseOptions" signals an error indicating that the options string includes invalid data and subsequently aborts 426. If at 416, "parseOptions" determines that the test has been passed, diagram 400 proceeds to 420, where "parseOptions" returns the parsed parts to the caller.

The instantiation routine that is drawn in FIG. 3 can include the parsing of the options string, as per FIG. 4, in its body. All in all, the sample implementation of the instantiation routine closely tracks the associated diagram in FIG. 3. One minor difference is that the actual implementation relies on constructors storing passed values into objects being constructed, whereas the figures clearly suggest storing. Of three checks performed on the options string by the inlined version of the routine in FIG. 4, the check of whether the extracted process identifier makes up a valid one is skipped. Alternatively, a concrete implementation may choose to perform this check to uphold the invocation contract.

The sample implementation of the instantiation routine is following:

```
static private Patcher instantiate(String options,
    Instrumentation handle)
    throws IllegalArgumentException {int
    index=options.indexOf('&', 0);
    if (index<0||index>=options.length( ))
        throw new IllegalArgumentException(
            "options do not adhere to the format"
        );
    String processId;
    Path tasksDirectory;
    processId=options.substring(0, index);
    /*Optionally,
        verify that the process identifier is valid */
    tasksDirectory=Paths.get(options.substring(index+1));
    if (!Files.isDirectory(tasksDirectory,
        LinkOption.NOFOLLOW_LINKS))
    throw new IllegalArgumentException(
        "no directory with tasks"
    );
    Patcher instance;
    Thread thread;
    instance=new Patcher(tasksDirectory,
        handle);
    thread=new Thread(instance, "JavaPatcher");
    thread.setDaemon(true);
    thread.start( );
    System.setProperty("JavaPatcher. Handshake",
        processId);
    return instance;
}
```

Figure 5:
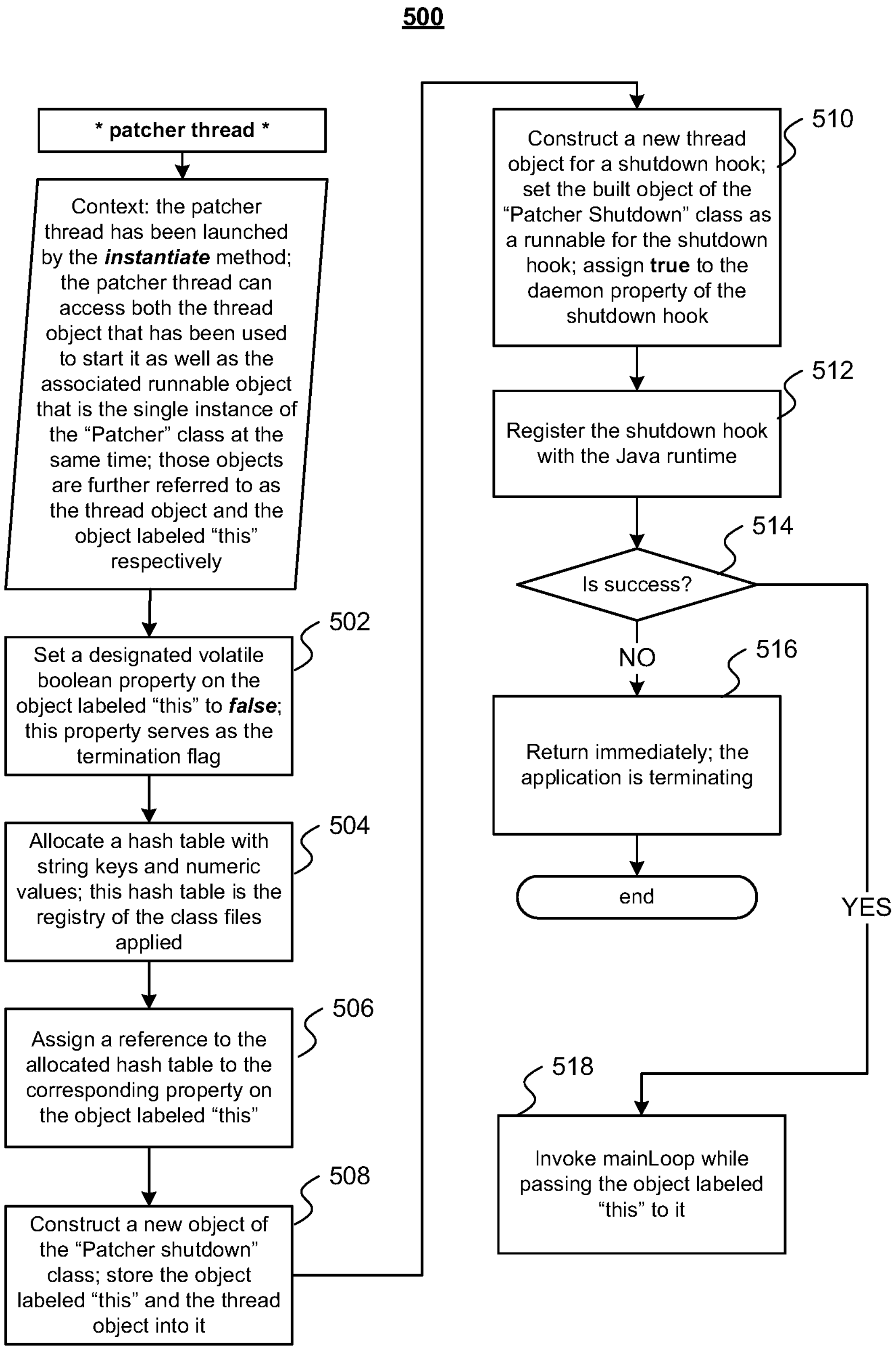
FIG. 5 is a flow diagram that illustrates an initialization sequence of a patcher thread.

FIG. 5 is a flow diagram 500 that illustrates an initialization sequence of a patcher thread 112. Patcher thread 112 is launched by "instantiate" and can access both the thread object that has been used to start it as well as the associated runnable object that is the single instance of the "Patcher" class at the same time. These objects are further referred to as the thread object and the object labeled "this" respectively.

In flow diagram 500, at 502, patcher thread 112 sets a designated volatile boolean property on the object labeled "this" to false; this property serves as the termination flag. At 504, patcher thread 112 allocates a hash table with string keys and numeric values; this hash table is the registry of the class files applied. At 506, patcher thread 112 assigns a reference to the allocated hash table to the corresponding property on the object labeled "this." At 508, patcher thread 112 constructs a new object of the "Patcher shutdown" class and stores the object labeled "this" and the thread object into it. At 510, patcher thread 112 constructs a new thread object for a shutdown hook, sets the built object of the "Patcher Shutdown" class as a runnable for the shutdown hook, and assigns "true" to the daemon property of the shutdown hook. At 512, patcher thread 112 registers the shutdown hook with the Java runtime.

At 514, patcher thread 112 determines whether the registration was a success. If not, diagram 500 advances to 516, where patcher thread 112 returns immediately (i.e., the application is terminating). If at 514, patcher thread 112 determines that the registration is not a success, diagram advances to 518, where patcher thread 112 invokes "mainLoop" while passing the object labeled "this" to it.

FIG. 5 demonstrates what actions the patcher thread 112 takes after it is spawned by the instantiation routine in the context of the special listener thread. Typically, these actions are encompassed by the "run" method from which a thread commences its execution. In the sample implementation, the "run" method that is defined in the patcher class includes both the logic in FIG. 5 and the main loop in FIG. 7. Given that the "run" method is not static, the code within this method is able to access the special "this" parameter that is a reference to the single instance of the patcher class. This instance is conveniently used to keep important global values that must persist over the lifetime of the host Java application. The corresponding fragment of the sample implementation is given below. There is another difference between the diagrams and the actual implementation. Instead of using numeric timestamp values, the registry uses "FileTime" objects to represent timestamps. A "FileTime" object is the standard way of handling a file's timestamp. This object both incorporates a numeric timestamp value and provides methods for manipulating it.

```
public void run( ) {
    this.terminationFlag=false;
    this.registry=new HashMap<String, FileTime>( );
    PatcherShutdown instance;
    Thread thread;
    instance=new PatcherShutdown(this,
        Thread.currentThread( ));
    thread=new Thread(instance, "JavaPatcherExit");
    thread.setDaemon(true);
    try {
        Runtime rt=Runtime.getRuntime( );
        rt. addShutdownHook(thread);
    } catch (IllegalStateException exc) {
        /* The host application is terminating . . . */
        return;
    }
    final long timeToSleepInMillis=500L;
    while (!this.terminationFlag) {
        try {
            scan( );
        } catch (IOException exc) {
            ;
        }
        try {
            Thread.sleep(timeToSleepInMillis);
        } catch (InterruptedException exc) {
            ;
        }
    }
}
```

Figure 6:
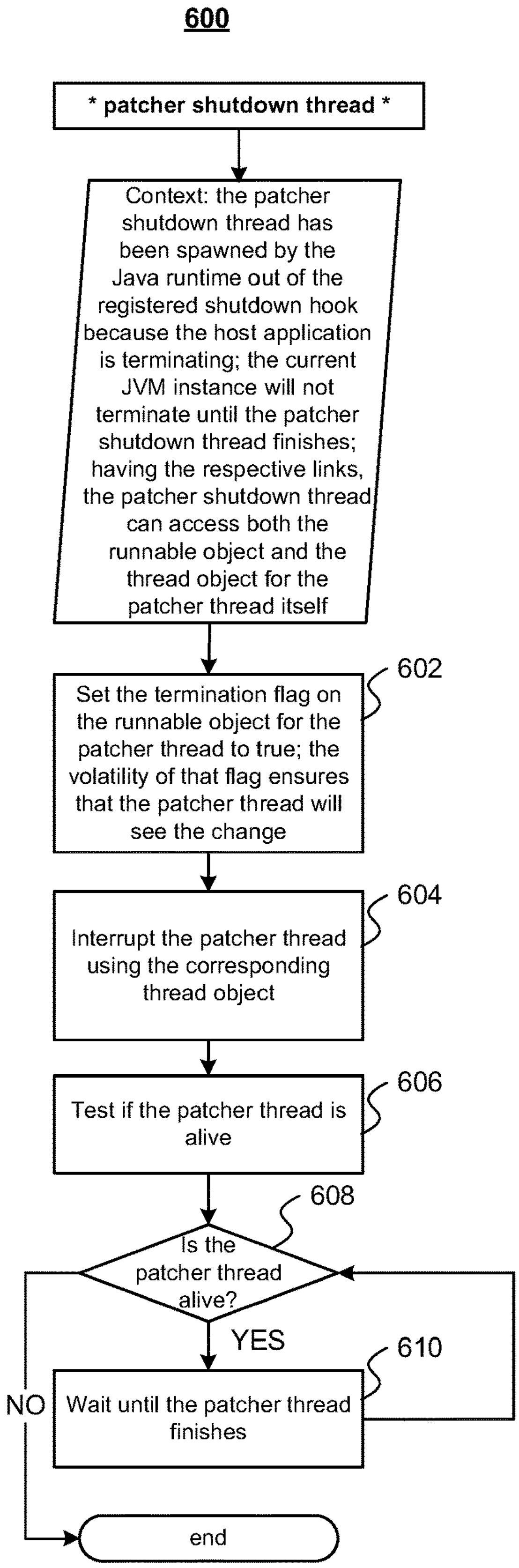
FIG. 6 is a flow diagram that illustrates a patcher shutdown thread.

FIG. 6 is a flow diagram 600 that illustrates a patcher shutdown thread 114.

Patcher shutdown thread 114 is spawned by the Java runtime out of the registered shutdown hook because the host application is terminating. JVM instance 102 does not terminate until the patcher shutdown thread 114 finishes. Having the respective links, patcher shutdown thread 114 can access both the runnable object and the thread object for the patcher thread itself.

In flow diagram 600, at 602, patcher shutdown thread 114 sets the termination flag on the runnable object for the patcher thread to "true." The volatility of that flag ensures that the patcher thread 112 will see the change. At 604, patcher shutdown thread 114 interrupts the patcher thread 112 using the corresponding thread object. At 606, patcher shutdown thread 114 tests if the patcher thread 112 is alive. At 608, patcher shutdown thread 114 makes a determination whether the patch thread 112 is alive. If it is alive, at 610, patcher shutdown thread 114 waits until the patcher thread 112 is finished running. If the thread is not alive, diagram 600 ends.

FIG. 6 describes the design of the patcher shutdown thread 114 that is started by the Java run-time when the host application 108 terminates. By leveraging the fact that the Java run-time waits until this shutdown thread finishes, it is possible to notify the patcher thread 112 and, in turn, wait until that thread 112 finishes thus ensuring that the live patching agent 106 relinquishes all the resources held. In the sample implementation, all the thread's logic is put into the "run" method. To provide the correct ordering of events, it is necessary to set the termination flag, that is a volatile field of the sole instance of the patcher class, before interrupting the patcher thread 112. The code fragment for the patcher shutdown thread's "run" method is given below.

```
public void run( ) {
    this.patcherInstance.terminationFlag=true;
    this.patcherThread.interrupt( );
    while (this.patcherThread.isAlive( )) {
        try {
            this.patcherThread.join ( );
        } catch (InterruptedException exc) {
            ;
        }
    }
}
```

Figure 7:
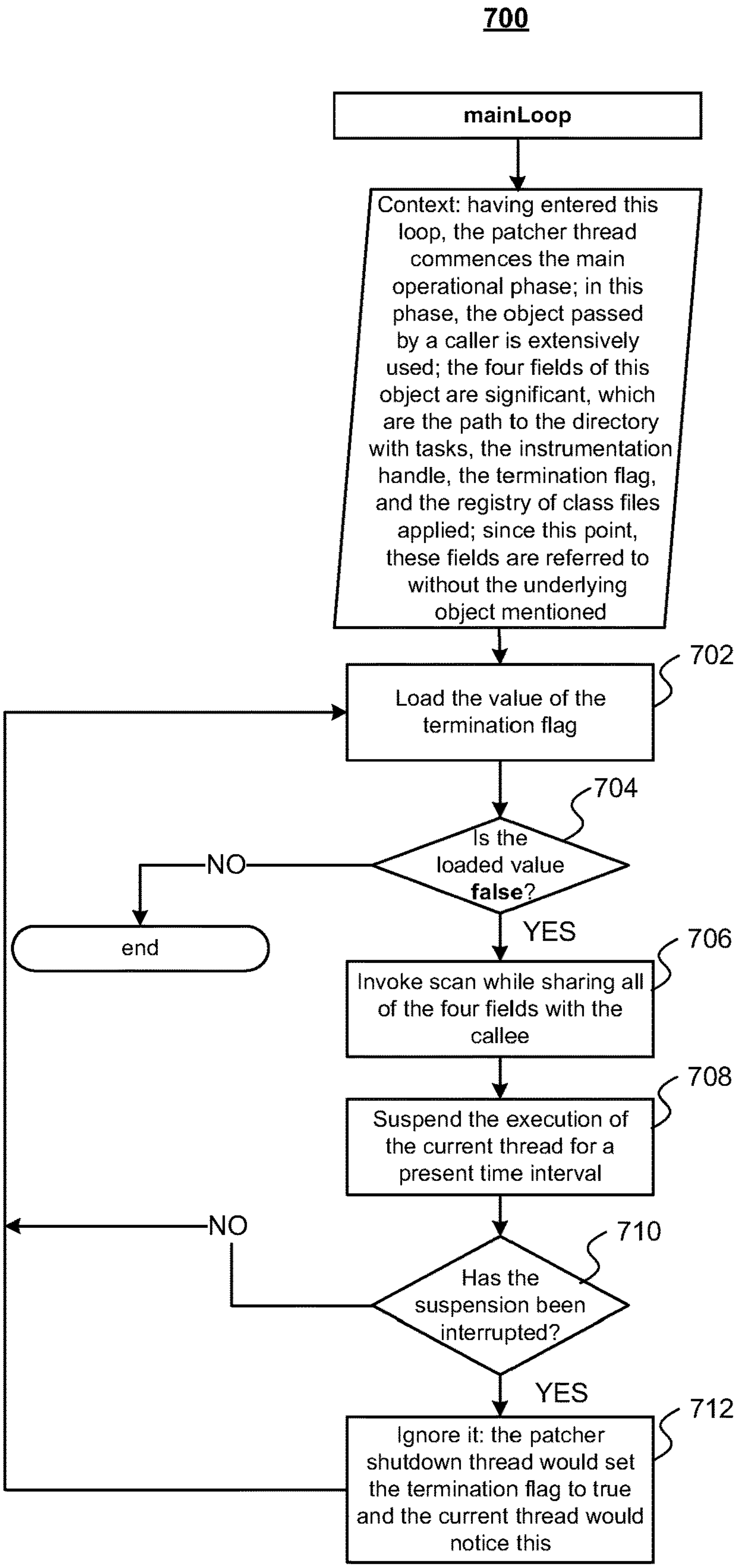
FIG. 7 is a flow diagram that illustrates the main loop underlying a polling technique.

FIG. 7 is a flow diagram 700 that illustrates the "mainLoop" underlying a polling technique. Having entered this loop, the patcher thread 112 commences the main operational phase in which the object passed by a caller is extensively used. The four fields of this object are significant, including (1) the path to the directory with tasks (e.g., tasks directory 116), (2) the instrumentation handle, (3) the termination flag, and (4) the registry of class files applied. Since this point, these fields are referred to without the underlying object mentioned.

In flow diagram 700, at 702, "mainLoop" loads the value of the termination flag. At 704, "mainLoop" determines whether the loaded value is "false." If yes, at 706, "mainLoop" invokes scan (diagram 800) while sharing all of the four fields with the callee. At 708, "mainLoop" suspends the execution of the current thread for a present time interval. At 710, "mainLoop" determines whether the suspension was interrupted. If yes, at 712, "mainLoop" ignores the interruption as the patcher shutdown thread 114 will set the termination flag to "true" and the current thread would notice this. If "mainLoop" determines that the loaded value is not "false" at 704, diagram 700 ends. After 712 or if "mainLoop" does not determine that the suspension has been interrupted at 710, diagram 700 proceeds to 702.

Figure 8:
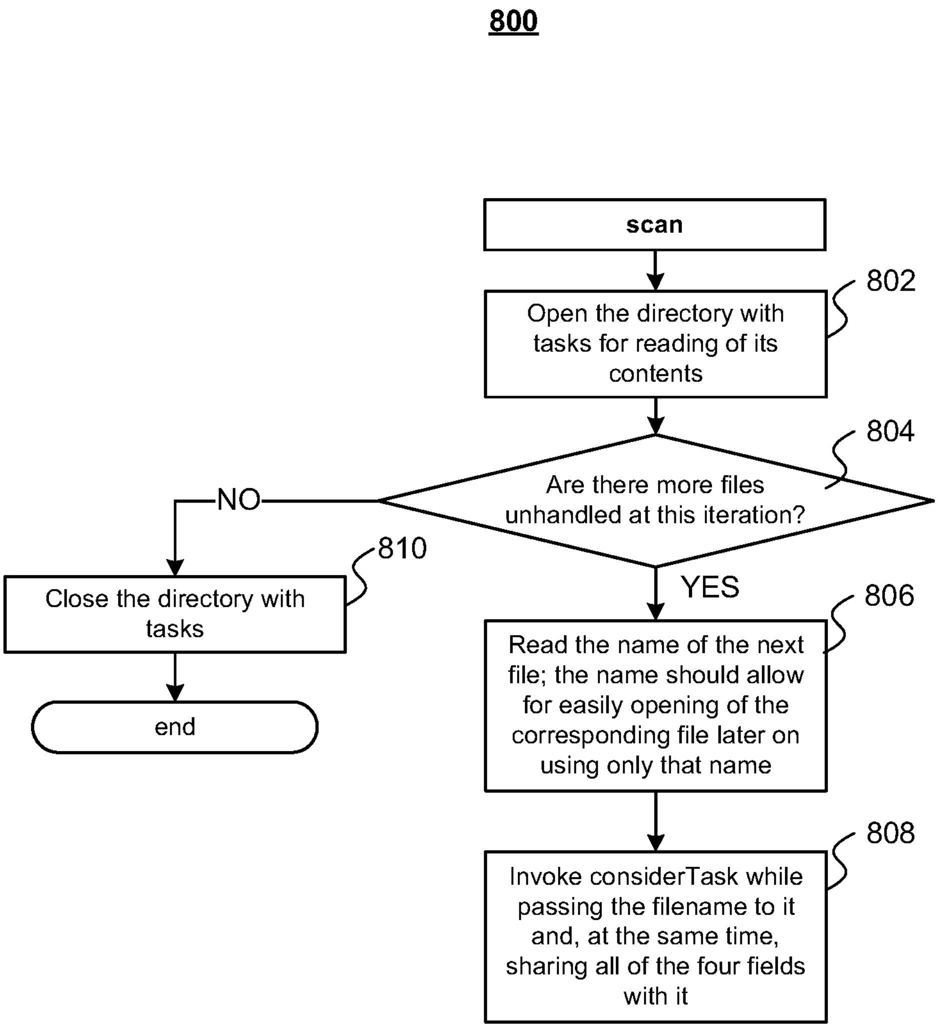
FIG. 8 is a flow diagram that illustrates a single round of scanning of a tasks directory.

FIG. 8 is a flow diagram 800 that illustrates a single round of scanning of a tasks directory. FIG. 8 presents the top layer of a single iteration of the polling procedure. This layer traverses through all the existing files in the tasks directory. Each file is assumed to be a class file whose name denotes the fully qualified name of a target class. For each file, the middle layer (e.g., "considerTask") is invoked with a file path to decide if the corresponding class file constitutes a task and, hence, should be applied on the current JVM instance. The sample implementation, which is further given, closely follows the associated diagram.

In flow diagram 800, at 802, the routine "scan" opens tasks directory 116 for reading of its contents. At 804, "scan" determines whether there are more files unhandled at the current iteration. If yes, at 806, "scan" reads the name of the next file. The name should allow for easily opening of the corresponding file later on using only that name. At 808, "scan" invokes "considerTask" while passing the filename to it and, at the same time, sharing all of the four fields with it.

If at 904, "scan" determines that there are not more files unhandled at the current iteration, at 810, "scan" closes the tasks directory 116.

One thing worth clarification is that the "scan" method is not static, similar to the "run" method of the same patcher class. This also allows the former method to access the single instance of the patcher class via the special "this" parameter, therefore enabling easy sharing of all the needed global values across all the layers.

```
private void scan( )
   throws IOException {
   DirectoryStream<Path>tasksStream;
   tasksStream=Files.newDirectoryStream(this.tasksDi-
      rectory);
   try {
      for (Path path: tasksStream) {
         considerTask(path);
      }
   } catch (DirectoryIteratorException exc) {
      throw exc.getCause( );
   } finally {
      try {
         tasksStream.close( );
      } catch (IOException exc) {
         ;
      }
   }
}
```

The middle layer (e.g., "considerTask") and the bottom layer (e.g., "doTask"), rely on a utility class that performs file related functions (e.g., class name extraction, reflection object lookup, and computing of modification timestamps). This class serves as a type for objects keeping all the metadata about patching tasks. The sample code of this class is further provided.

```
class Task {
   private Path path;
   private String className;
   private Class<?> classObj;
   private Task( ) { }
   private Class<?> lookupClassObj( ) {
      Class<?> cls=null;
      try {
         cls=Class.forName(this.className,
            false,
            Class Loader.getSystemClass Loader( ));
      } catch (Throwable exc) {
         ;
      }
      return cls;
   }
   private void setClassData( ) {
      String pathStr=this.path.toString( );
      String sep=this.path.getFileSystem( ).getSeparator(
         );
      int sepPos=pathStr.lastIndexOf(sep);
      this.className=(sepPos==-1?
         pathStr:
         pathStr.substring(sepPos+sep.length( )));
      this.classObj=lookupClassObj( );
   }
   Task (Path path) {
      this.path=path;
      setClassData( );
      this.attrs=null;
   }
   Path getPath( ) {
      return this.path;
   }
   String getClassName( ) {
      return this.className;
   }
   Class<?> getClassObj( ) {
      return this.classObj;
   }
   private PosixFileAttributes attrs;
   PosixFileAttributes getAttrs( )
      throws IOException {
      if (this.attrs==null) {
         this.attrs=Files.readAttributes(this.path,
            PosixFileAttributes.class);
      }
      return this.attrs;
   }
   FileTime getFileModTime( )
      throws IOException {
      return this.getAttrs( ).lastModifiedTime( );
   }
   int getFileSize( )
      throws IOException {
      long size;
      size=this.getAttrs( ).size( );
      if (size<0L||size> (long) Integer.MAX_VALUE)
         throw new IOException ("a task file is too big");
      return (int) size;
   }
}
```

With an object of this class, passing arguments down a call chain is greatly simplified. Among such arguments are filenames, class names, and timestamps.

Figure 9:
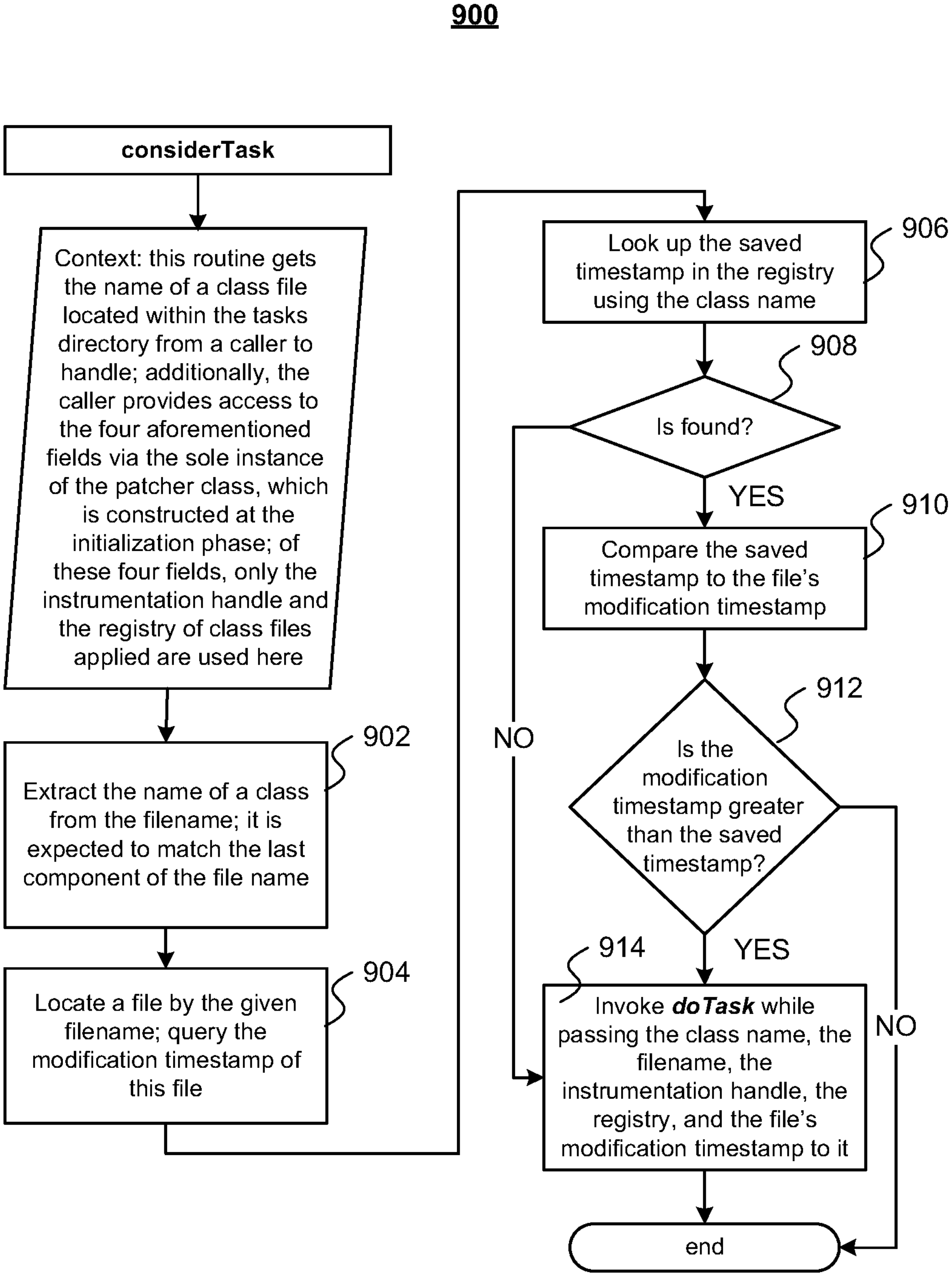
FIG. 9 is a flow diagram that illustrates the process of making a decision about whether to apply a particular class file.

FIG. 9 is a flow diagram 900 that illustrates the process of making a decision about whether to apply a particular class file. "considerTask" gets the name of a class file located within the tasks directory 116 from a caller to handle. Additionally, the caller provides access to the four aforementioned fields via the sole instance of the patcher class, which is constructed at the initialization phase. Of these four fields, only the instrumentation handle and the registry of class files applied are used here.

In flow diagram 900, at 902, "considerTask" extracts the name of a class from the filename. This name is expected to match the last component of the file name. At 904, "considerTask" locates a file by the given filename and queries the modification timestamp of this file.

At 906, "considerTask" looks up the saved timestamp in the registry using the class name. At 908, "considerTask" determines whether the saved timestamp is found. If not, diagram 900 proceeds to 914. If yes, diagram 900 proceeds to 910, where "considerTask" compares the saved timestamp to the file's modification timestamp. At 912, "considerTask" determines whether the modification timestamp is greater than the saved timestamp (came after). If not, diagram 900 ends. If yes, diagram 900 proceeds to 914, where "considerTask" invokes "doTask" while passing the class name, the filename, the instrumentation handle, the registry, and the file's modification timestamp to it (described further in diagram 1000). After 914, diagram 900 ends.

FIG. 9 illustrates the middle layer that is made of the routine that decides if a class file needs to be applied on the current JVM instance 102. The class file is referred to by a file path provided as an argument. The sample implementation uses the utility class described above to carry out all the file related operations. Initially, the "considerTask" method creates a task object. Subsequently, the task object is passed to the bottom layer unless the corresponding class file is found to be already applied on the current JVM instance. The relevant code extract is further given.

```
private void considerTask(Path path)
   throws IOException {
   FileTime oldTS, newTS;
   Task task=new Task(path);
   newTS=task.getFileModTime( );
   oldTS=this.registry.get(task.getClassName( ));
   if (oldTS!=null && oldTS.compareTo(newTS)>=0)
      return;
   doTask (task);
}
```

Figure 10:
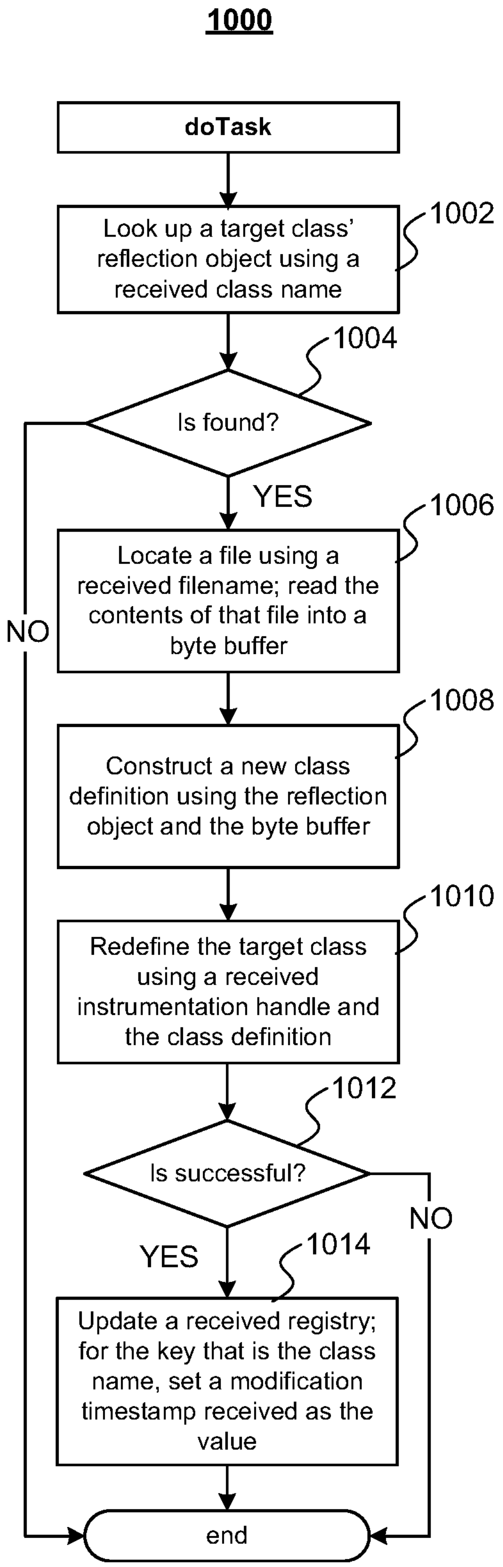
FIG. 10 is a flow diagram that illustrates a method of applying a particular class file and updating the registry.

FIG. 10 is a flow diagram 1000 that illustrates the "doTask" routine of applying a particular class file and updating the registry. In flow diagram 1000, at 1002, "doTask" looks up a target class' reflection object using a received class name. At 1004, "doTask" determines whether the object is found. If not, diagram 1000 ends. If yes, at 1006, "doTask" locates a file using a received filename and reads the contents of that file into a byte buffer. At 1008, "doTask" constructs a new class definition using the reflection object and the byte buffer. At 1010, "doTask" redefines the target class using a received instrumentation handle and the class definition. At 1012, "doTask" determines whether the redefinition was successful. If not, diagram 1000 ends. If yes, at 1014, "doTask" updates a received registry. More specifically, for the key that is the class name, "doTask" sets a modification timestamp received as the value.

FIG. 10 depicts the bottom layer of a single iteration of the polling procedure. This layer consists of four steps. The first step is to obtain a reference to the reflection object of the target class, or to verify that this reference is valid if using the utility class described above. The next step is to read the contents of the class file into a local byte buffer. The sample implementation employs memory mapping of the class file and reading all the bytes from there. The main step comes next. It constitutes the update of the run-time image of the target class with the read bytes. This is achieved by constructing a new class definition with the reflection object and the local byte buffer and using the class redefinition API with this definition. Depending on the outcome, the last step either updates the registry with a new entry mapping the class name onto the modification timestamp of the corresponding class file or does nothing. For an actual implementation, it is sufficient to catch any exception raised after using the class redefinition API and return from the "doTask" method immediately in the exception handler. The code snippet for the bottom layer is as follows:

```
private void doTask (Task task)
   throws IOException {
   if (task.getClassObj( )==null)
      return;
   /* Read a file by mapping its contents onto memory */
   FileChannel fileChannel;
   int fileSize;
   MappedByteBuffer fileBuffer;
   byte[ ] classBytes;
   fileChannel=(FileChannel)        Files.newByteChannel
      (task.getPath( )
StandardOpenOption.READ);
   try {
      fileSize=task.getFileSize( );
      fileBuffer=fileChannel.map(FileChannel.MapMo-
         de.READ_ONLY,
         0L,
         (long) fileSize);
      classBytes=new byte[fileSize];
      fileBuffer.get(classBytes, 0, fileSize);
   } finally {
      try {
         fileChannel.close( );
      } catch (IOException exc) {
         ;
      }
   }
   /* Replace the definition of a target class */
   ClassDefinition definition;
   definition=new ClassDefinition(task.getClassObj( ),
      classBytes);
   try {
      this.handle.redefineClasses(definition);
   } catch (Throwable exc) {
      return;
   }
   /* Update the registry */
   this.registry.put(task.getClassName( ),
      task.getFileModTime( ));
}
```

FIG. 11 is a flow diagram 1100 illustrating an example of two threads accessing a static field. Assuming multiple threads may access a shared static field, two threads may simultaneously invoke the "agentmain" method. The threads (e.g., thread #1 and thread #2) may follow the same sequence of actions as shown in FIG. 11. From diagram 1100, it is clear that if a thread loads the value of a static field a second time (time 12), it could see a completely different value—in which case, there is no need to perform initialization since the patcher instance was already created.

Figure 12:
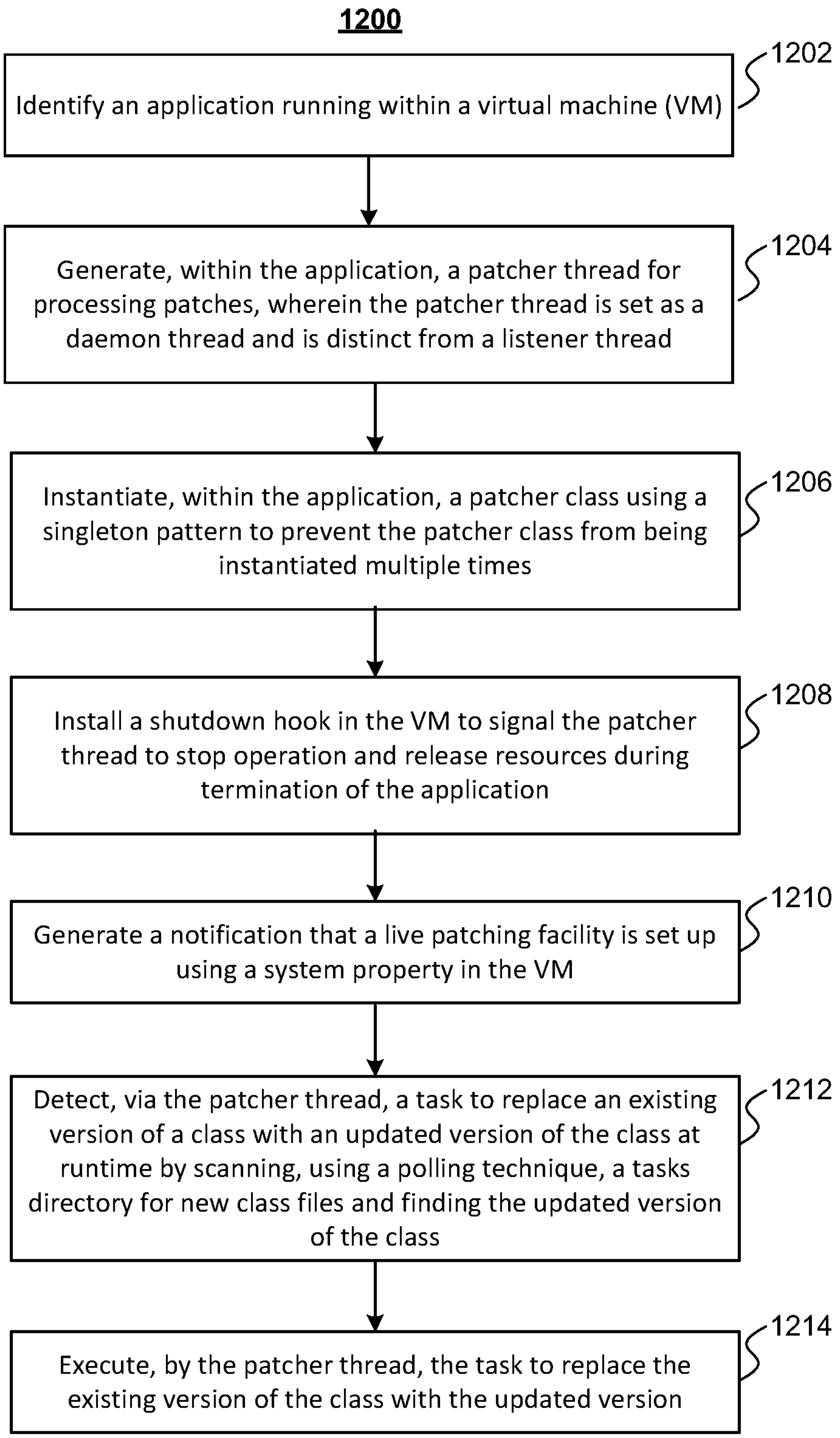
FIG. 12 is a flow diagram illustrating a method for dynamically updating classes in a running application.

FIG. 12 is a flow diagram illustrating method 1200 for dynamically updating classes in a running application. In one example, a Java agent is loaded by an external controlling system into a Java Virtual Machine. Each Java Virtual Machine (instance, JVM instance) runs a single application. At 1202, agent 106 identifies an application (e.g., Java application 108) running within a virtual machine (e.g., JVM instance 102). At 1204, agent 106 generates, within the application, a patcher thread (e.g., patcher thread 112) for processing patches, wherein the patcher thread is set as a daemon thread and is distinct from a listener thread. Patcher thread 112 is logically included within a live patching agent. Technically, all threads comprising a JVM instance (e.g., a Java process) are equal for the operating system, but to simplify description, these threads are logically grouped as those belonging to the application (such threads encompass the business logic of this application) and those fulfilling the live patching agent's duties.

More specifically, agent 106 may instantiate the patcher thread during execution of an agentmain routine of the live patching Java agent and may set a daemon property of the patcher thread before a start routine is invoked to allow for the termination of the application.

At 1206, agent 106 instantiates, within the application, a patcher class using a singleton pattern to prevent the patcher class from being instantiated multiple times. In some aspects, agent 106 manages synchronization to control access to the patcher class using a complementary field and a guarded field. In some aspects, the complementary field includes an object used for a monitor that is set to guard access to the guarded field, which comprises null as a default value.

In some aspects, the object in the complementary field is a java.lang.Object class. Instantiation of the patcher class is managed through the complementary field for synchronization purposes. Agent 106 may use a reflection object of the patcher class for synchronization instead of the complementary field.

At 1208, agent 106 installs a shutdown hook in the VM to signal the patcher thread to stop operation and release resources during termination of the application. In some aspects, agent 106 registers the shutdown hook in a run routine of the patcher thread to ensure execution upon the termination of the application.

At 1210, agent 106 generates a notification that a live patching facility is set up using a system property in the VM. More specifically, agent 106 generates the notification by setting a designated system property in a system properties table of the VM.

Subsequent to generating the notification, the agentmain routine of agent 106 receives an options string and an instance of a java.lang.instrument.Instrumentation class as arguments. The options string includes a file system path to the task directory comprising updated class files.

At 1212, agent 106 detects, via the patcher thread, a task to replace an existing version of a class (e.g., in registry of loaded classes 104) with an updated version of the class at runtime by scanning, using a polling technique, a tasks directory (e.g., tasks directory 116) for new class files and finding the updated version of the class. These are main containers for code and data in Java programming. An example of a class could be, for instance, java.lang.String which implements objects managing sequences of characters. It provides methods like getting the length of a string or joining two strings together (concatenation). Such classes are identified by a fully qualified name in the usual dot notation (e.g., java.lang.String). Physically, they are stored in files in a special format. Such files are produced by the Java compiler (e.g., javac). Upon loading, such files are parsed by the JVM internal machinery to produce run-time images of the corresponding classes. These images are stored in a global hash table with fully qualified names as keys. In the diagram, this hash table is called "registry of loaded classes". Every reference to a class in Java code passes through this registry. In this paragraph, the task files are mere class files to facilitate usage of the JVM class loading machinery.

More specifically, agent 106 scans the task directory periodically for new class files representing updated classes. Agent 106 then determines an eligibility of class files for update based on modification timestamps and a registry of applied class files. This is a separate hash table than registry 104. This hash table is a part of the live patching agent's code. It maps the fully qualified names of classes onto the modification timestamps of the corresponding task files. Basically, agent 106 needs to know which classes have been applied (live patched) and how actual are they (e.g., modification timestamps of task files). To store this information, agent 106 uses a "hash table" container. Then, on each iteration, agent 106 extracts the modification timestamp of a task file with the OS facilities and compares it with the stored value in this hash table to decide if agent 106 should proceed with the live patching.

At 1114, agent 106 executes, by the patcher thread, the task to replace the existing version of the class with the updated version. In some aspects, agent 106 executes a redefineClasses routine on an instrumentation object to apply updates to loaded classes and only allowing changes to routine bodies while keeping externally visible signatures constant.

Figure 13:
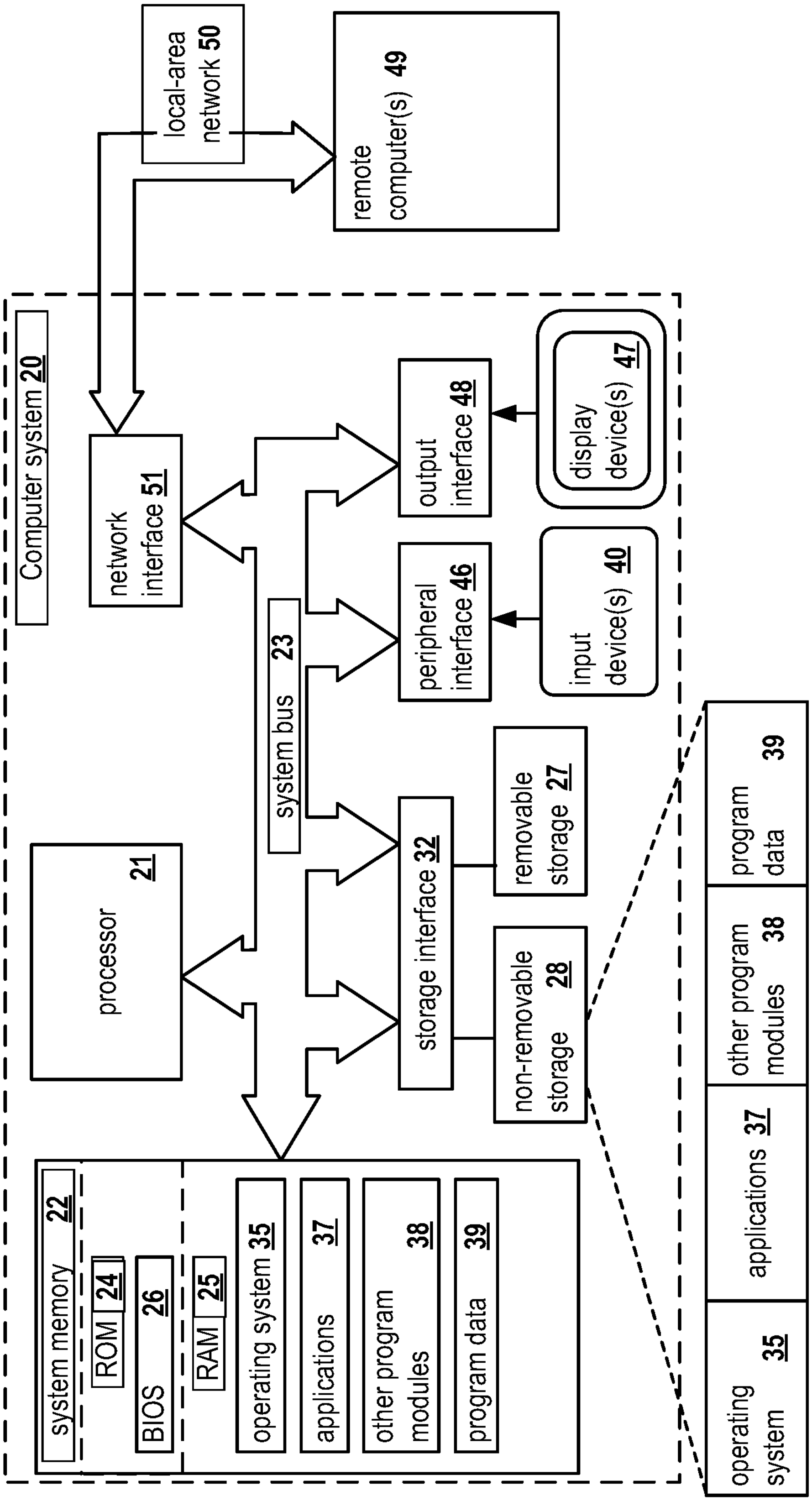
FIG. 13 presents an example of a general-purpose computer system on which aspects of the present disclosure can be implemented.

FIG. 13 is a block diagram illustrating a computer system 20 on which aspects of systems and methods for loading modified classes into a running application may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-11 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for dynamically updating classes in a running application, a method comprising:

identifying an application running within a virtual machine (VM);

generating, within the application, a patcher thread for processing patches, wherein the patcher thread is set as a daemon thread and is distinct from a listener thread;

instantiating, within the application, a patcher class using a singleton pattern to prevent the patcher class from being instantiated multiple times;

installing a shutdown hook in the VM to signal the patcher thread to stop operation and release resources during termination of the application;

generating a notification that a live patching facility is set up using a system property in the VM;

detecting, via the patcher thread, a task to replace an existing version of a class with an updated version of the class at runtime by periodically scanning, using a polling technique, a local file system tasks directory for new class files, wherein each class file in the tasks directory has a name corresponding to a fully qualified name of a target class, and wherein finding the updated version of the class comprises determining that the class file has not been previously applied or that a modification timestamp of the class file is greater than a last recorded modification timestamp for the target class maintained in a registry of applied class files; and executing, by the patcher thread, the task to replace the existing version of the class with the updated version.

2. The method of claim 1, wherein the VM is a Java Virtual Machine (JVM).

3. The method of claim 2, further comprising managing synchronization to control access to the patcher class using a complementary field and a guarded field, wherein the complementary field comprises an object used for a monitor that is set to guard access to the guarded field, and wherein the guarded field comprises null as a default value.

4. The method of claim 3, wherein the object comprises a java.lang. Object class, and wherein instantiation of the patcher class is managed through the complementary field for synchronization purposes, further comprising:

using a reflection object of the patcher class for synchronization instead of the complementary field.

5. The method of claim 2, wherein generating, within the application, the patcher thread comprises:

instantiating the patcher thread during execution of an agentmain routine of a live patching Java agent; and setting a daemon property of the patcher thread before a start routine is invoked to allow for the termination of the application.

6. The method of claim 5, wherein subsequent to generating the notification, the agentmain routine receives an options string and an instance of a java.lang.instrument.Instrumentation class as arguments, wherein the options string includes a file system path to the tasks directory comprising updated class files.

7. The method of claim 6, further comprising:

determining an eligibility of class files for update based on modification timestamps and a registry of applied class files.

8. The method of claim 2, further comprising executing a redefineClasses routine on an instrumentation object to apply updates to loaded classes and only allowing changes to routine bodies while keeping externally visible signatures constant.

9. The method of claim 1, further comprising registering the shutdown hook in a run routine of the patcher thread to ensure execution upon the termination of the application.

10. The method of claim 1, wherein generating the notification comprises setting a designated system property in a system properties table of the VM.

11. A system for dynamically updating classes in a running application, comprising:

at least one memory; and at least one hardware processor coupled with the at least one memory and configured, individually or in combination, to:

identify an application running within a virtual machine (VM);

generate, within the application, a patcher thread for processing patches, wherein the patcher thread is set as a daemon thread and is distinct from a listener thread;

instantiate, within the application, a patcher class using a singleton pattern to prevent the patcher class from being instantiated multiple times;

install a shutdown hook in the VM to signal the patcher thread to stop operation and release resources during termination of the application;

generate a notification that a live patching facility is set up using a system property in the VM;

detect, via the patcher thread, a task to replace an existing version of a class with an updated version of the class at runtime by periodically scanning, using a polling technique, a local file system tasks directory for new class files, wherein each class file in the tasks directory has a name corresponding to a fully qualified name of a target class, and wherein finding the updated version of the class comprises determining that the class file has not been previously applied or that a modification timestamp of the class file is greater than a last recorded modification timestamp for the target class maintained in a registry of applied class files; and execute, by the patcher thread, the task to replace the existing version of the class with the updated version.

12. The system of claim 11, wherein the VM is a Java Virtual Machine (JVM).

13. The system of claim 12, wherein the at least one hardware processor is further configured to manage synchronization to control access to the patcher class using a complementary field and a guarded field, wherein the complementary field comprises an object used for a monitor that is set to guard access to the guarded field, and wherein the guarded field comprises null as a default value.

14. The system of claim 13, wherein the object comprises a java.lang. Object class, and wherein instantiation of the patcher class is managed through the complementary field for synchronization purposes, wherein the at least one hardware processor is further configured to:

use a reflection object of the patcher class for synchronization instead of the complementary field.

15. The system of claim 12, wherein the at least one hardware processor is further configured to generate, within the application, the patcher thread by:

instantiating the patcher thread during execution of an agentmain routine of a live patching Java agent; and setting a daemon property of the patcher thread before a start routine is invoked to allow for the termination of the application.

16. The system of claim 15, wherein subsequent to generating the notification, the agentmain routine receives an options string and an instance of a java.lang.instrument. Instrumentation class as arguments, wherein the options string includes a file system path to the tasks directory comprising updated class files.

17. The system of claim 16, wherein the at least one hardware processor is further configured to:

determine an eligibility of class files for update based on modification timestamps and a registry of applied class files.

18. The system of claim 12, wherein the at least one hardware processor is further configured to execute a redefineClasses routine on an instrumentation object to apply updates to loaded classes and only allowing changes to routine bodies while keeping externally visible signatures constant.

19. The system of claim 11, wherein the at least one hardware processor is further configured to register the shutdown hook in a run routine of the patcher thread to ensure execution upon the termination of the application.

20. A non-transitory computer readable medium storing thereon computer executable instructions for dynamically updating classes in a running application, including instructions for:

identifying an application running within a virtual machine (VM);

generating, within the application, a patcher thread for processing patches, wherein the patcher thread is set as a daemon thread and is distinct from a listener thread;

instantiating, within the application, a patcher class using a singleton pattern to prevent the patcher class from being instantiated multiple times;

installing a shutdown hook in the VM to signal the patcher thread to stop operation and release resources during termination of the application;

generating a notification that a live patching facility is set up using a system property in the VM;

detecting, via the patcher thread, a task to replace an existing version of a class with an updated version of the class at runtime by periodically scanning, using a polling technique, a local file system tasks directory for new class files, wherein each class file in the tasks directory has a name corresponding to a fully qualified name of a target class, and wherein finding the updated version of the class comprises determining that the class file has not been previously applied or that a modification timestamp of the class file is greater than a last recorded modification timestamp for the target class maintained in a registry of applied class files; and executing, by the patcher thread, the task to replace the existing version of the class with the updated version.

* * * * *